(12) United States Patent
Page et al.

(10) Patent No.: US 9,268,382 B2
(45) Date of Patent: Feb. 23, 2016

(54) METHOD AND SYSTEM FOR MONITORING RESOURCE USAGE OF LOGICAL DOMAINS

(71) Applicant: Oracle International Corporation, Redwood Shores, CA (US)

(72) Inventors: Kellena Dunckley Page, Austin, TX (US); Julia Diane Harper, Arlington, MA (US)

(73) Assignee: Oracle International Corporation, Redwood Shores, CA (US)

( * ) Notice: Subject to any disclaimer, the term of this patent is extended or adjusted under 35 U.S.C. 154(b) by 310 days.

(21) Appl. No.: 13/932,715

(22) Filed: Jul. 1, 2013

(65) Prior Publication Data
US 2015/0006918 A1  Jan. 1, 2015

(51) Int. Cl.
*G06F 1/26* (2006.01)
*G06F 9/455* (2006.01)
*G06F 1/32* (2006.01)

(52) U.S. Cl.
CPC ............... *G06F 1/26* (2013.01); *G06F 1/3209* (2013.01); *G06F 9/45533* (2013.01)

(58) Field of Classification Search
CPC . G06F 1/3206; G06F 1/3209; G06F 9/45533; G06F 2009/45591
See application file for complete search history.

(56) References Cited

U.S. PATENT DOCUMENTS

| 2011/0072293 | A1* | 3/2011 | Mazzaferri et al. | 713/340 |
| 2011/0213997 | A1* | 9/2011 | Kansal et al. | 713/324 |
| 2012/0239323 | A1* | 9/2012 | McGrane et al. | 702/62 |

* cited by examiner

*Primary Examiner* — Albert Wang
(74) *Attorney, Agent, or Firm* — Osha Liang LLP

(57) ABSTRACT

A method for obtaining power management data for a system executing by at least one processor, where a plurality of logical domains are executing on the system. The method includes determining, using the power management data, power consumption for each of the plurality of logical domains and receiving a request for power consumption information for the system. The method further includes providing, in response to the request, the power consumption information, where the power consumption information specifies the power consumption for at least one of the plurality of logical domains.

16 Claims, 11 Drawing Sheets

TABLE A 500

Rolling Averages displayed in watts:

| DOMAIN | 15_SEC_AVG | 30_SEC_AVG | 60_SEC_AVG |
|---|---|---|---|
| primary | 58 | 59 | 59 |
| ldg1 | 10 | 11 | 11 |
| ldg2 | 12 | 10 | 11 |

FIG. 5A

TABLE B 510

Processor Power Consumption in Watts

| DOMAIN | TIMESTAMP | INSTANT | 15_SEC | 30_SEC | 60_SEC |
|---|---|---|---|---|---|
| primary | 05/04/2011 12:05:05 | 509 | 430 | 469 | 520 |
| guestdom1 | 05/04/2011 12:05:05 | 250 | 357 | 308 | 210 |
| guestdom2 | 05/04/2011 12:05:05 | 222 | 201 | 230 | 220 |
| primary | 05/04/2011 12:05:15 | 469 | 367 | 459 | 244 |
| guestdom1 | 05/04/2011 12:05:15 | 301 | 275 | 256 | 301 |
| guestdom2 | 05/04/2011 12:05:15 | 278 | 250 | 246 | 236 |
| primary | 05/04/2011 12:05:25 | 509 | 430 | 469 | 520 |
| guestdom1 | 05/04/2011 12:05:25 | 349 | 325 | 300 | 298 |
| guestdom2 | 05/04/2011 12:05:25 | 420 | 349 | 306 | 300 |

*FIG. 5B*

TABLE C 520

Per domain MINIMUM and MAXIMUM power consumption ever recorded:

| | | | |
|---|---|---|---|
| primary | 2012.08.29 06:59:55 | 151 | Min Processors |
| primary | 2012.08.29 06:56:20 | 682 | Max Processors |
| ldg1 | 2012.08.29 06:56:25 | 36 | Min Processors |
| ldg1 | 2012.08.29 07:02:10 | 318 | Max Processors |
| ldg2 | 2012.08.29 06:56:25 | 42 | Min Processors |
| ldg2 | 2012.08.29 07:05:45 | 417 | Max Processors |
| primary | 2012.08.29 06:59:55 | 137 | Min Memory |
| primary | 2012.08.29 06:56:20 | 138 | Max Memory |
| ldg1 | 2012.08.29 06:56:25 | 59 | Min Memory |
| ldg1 | 2012.08.29 07:02:10 | 60 | Max Memory |
| ldg2 | 2012.08.29 06:56:25 | 59 | Min Memory |
| ldg2 | 2012.08.29 07:05:45 | 60 | Max Memory |

*FIG. 5C*

TABLE D 530

12 hours worth of data starting from 05/04/2011 12:05:33:

| DOMAIN | TIMESTAMP | 1 HOUR AVG |
|---|---|---|
| primary | 05/04/2011 12:05:33 | 574 |
| ldg1 | 05/04/2011 12:05:33 | 268 |
| ldg2 | 05/04/2011 12:05:33 | 386 |
| primary | 05/04/2011 13:05:33 | 488 |
| ldg1 | 05/04/2011 13:05:33 | 250 |
| ldg2 | 05/04/2011 13:05:33 | 364 |
| primary | 05/04/2011 14:05:33 | 694 |
| ldg1 | 05/04/2011 14:05:33 | 276 |
| ldg2 | 05/04/2011 14:05:33 | 364 |

*FIG. 5D*

TABLE E 600

Extrapolated Power Consumption in Watts:

| DOMAIN | 15_SEC_AVG | 30_SEC_AVG | 60_SEC_AVG |
|---|---|---|---|
| primary | 315/38.14% | 469/42.79% | 520/53.46% |
| ldg1 | 275/33.72% | 308/32.68% | 210/21.99% |
| ldg2 | 250/24.14% | 230/24.53% | 220/24.55% |

TABLE F 610

Overall Instant System Power Consumption in Watts:

| | |
|---|---|
| System | 858 |
| Processors | 165 |
| Memory | 178 |
| Fans | 253 |

*FIG. 6*

METHOD AND SYSTEM FOR MONITORING RESOURCE USAGE OF LOGICAL DOMAINS

BACKGROUND

In order to improve the operation of a system, it is important to understand how the various components in the system use power or other system resources. Traditional systems are typically not able to provide accurate information about power and resource usage of virtual machines executing on a system

SUMMARY

In general, in one aspect, the invention relates to a non-transitory computer readable medium comprising instructions, which when executed by at least one processor perform a method. The method includes obtaining power management data for a system including at least one processor, wherein a plurality of logical domains are executing on the system and determining, using the power management data, power consumption for each of the plurality of logical domains. The method further includes receiving a request for power consumption information for the system and, in response to the request, providing the power consumption information, wherein the power consumption information specifies the power consumption for at least one of the plurality of logical domains.

In general, in one aspect, the invention relates to a system for displaying power consumption. The system includes a processor, a hypervisor operatively connected to a plurality of logical domains including a plurality of guest domains, and a control domain, wherein the control domain includes a logical domain manager (LDM). Further, the LDM includes an observability module configured to: obtain power management data for the system, determine, using the power management data, power consumption for each of the plurality of logical domains, receive a request for power consumption information for the system, and provide, in response to the request, the power consumption information, wherein the power consumption information specifies the power consumption for at least one of the plurality of logical domains.

Other aspects of the invention will be apparent from the following description and the appended claims.

BRIEF DESCRIPTION OF DRAWINGS

FIGS. 5A-5D and 6 show an example in one or more embodiments of the invention.

DETAILED DESCRIPTION

Figure 1A:
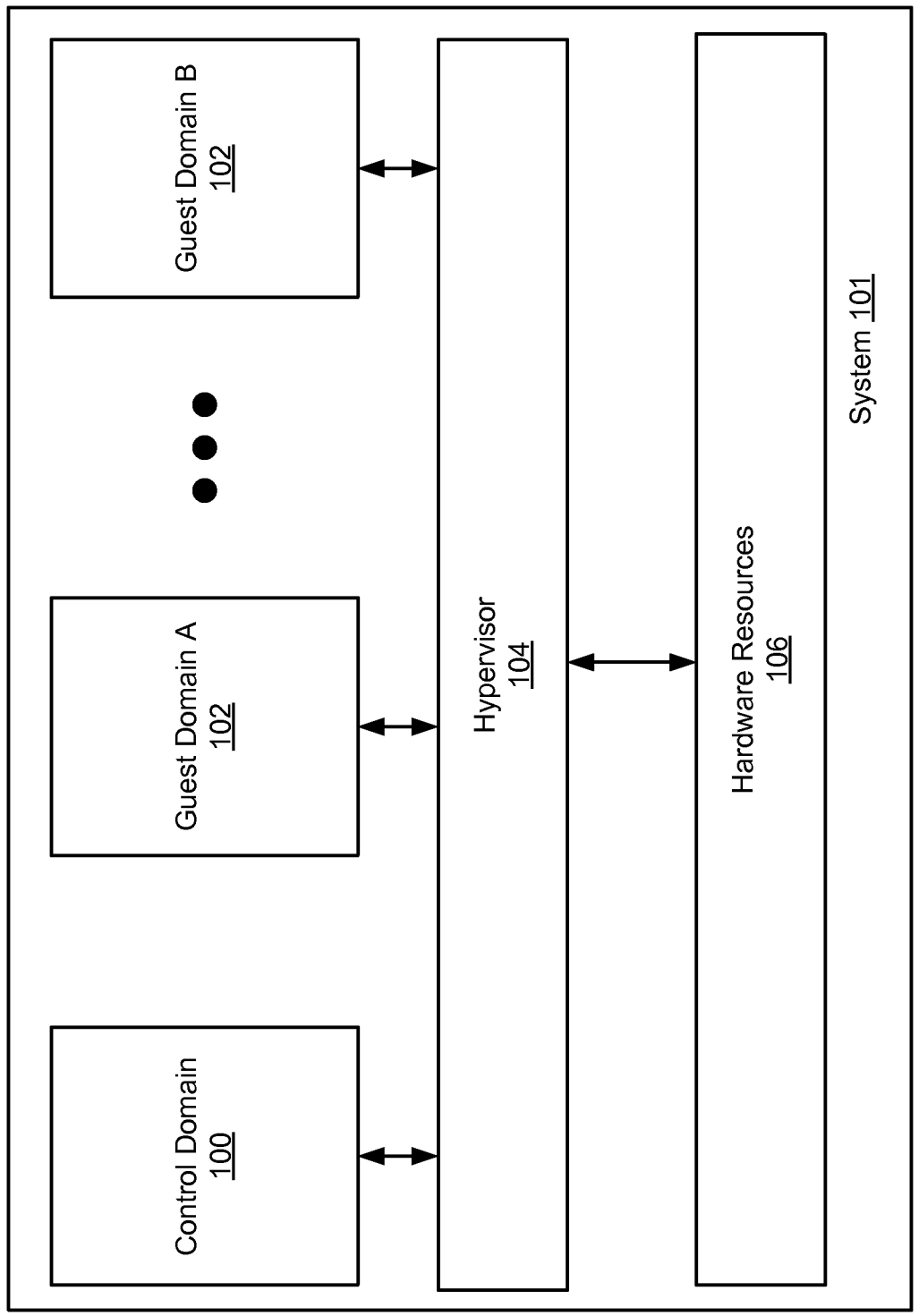
FIG. 1A shows a schematic diagram of a system in one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for calculating and displaying power consumption data. Specifically, embodiments of the invention provide a method and system to calculate the power consumption data for logical domains Further, using the power consumption data, ranges of averages may be determined. In one or more embodiments of the invention, the range of averages may present visibility into each logical domain's instantaneous power consumption, cumulative power consumption intervals, and rolling averages.

In one or more embodiments of the invention, power consumption refers to an amount of power (e.g., energy, watts, degrees, etc.) consumed in a process or system. More specifically, power consumption may include power consumption and/or usage of one or more logical domains.

In one or more embodiments of the invention, a logical domain is a virtual environment such as a virtual machine. The virtual environment may include its own operating system image or may share all or a portion of its operating system image with one or more other virtual environments in the system. Logical domains may be independently (relative to other logical domains in the system) created, deleted, reconfigured, and rebooted, independently. Further, multiple software applications may run independently in different logical domains for optimal performance and security.

FIG. 1A shows a schematic diagram of system (101) in one or more embodiments of the invention. As shown in FIG. 1A, the system includes a number of logical domains (e.g., a control domain (100) and one or more guest domains (102 A, 102 B)), a hypervisor (104), and hardware resource(s) (106). Each of these components is described below.

In one or more embodiments of the invention, the control domain (100) is a logical domain that includes functionality to control various aspects of the other logical domains. Specifically, the control domain (100) may, for example, create guest domains, manage guest domains, and allocate resources to the guest domains. The control domain (100) may also act as a service domain, which provides virtual services to other domains. For example, the control domain may serve as a virtual switch for other domains. In one or more embodiments of the invention, there is a single control domain (100) per system (101).

In one or more embodiments of the invention, each guest domain (102 A, 102 B) is a logical domain that is provide a virtual environment to one or more applications executing therein. The virtual environment provided by the logical domain is typically constrained by the resources allocated to the guest domain by the control domain. The guest domain may also use virtual services.

In one or more embodiments of the invention, the hypervisor (104) is an operating system that is interposed between the logical domains and the hardware resources (104). The logical domains typically execute in an execution environment provided by the Hypervisor. The Hypervisor (104) enables data transfer and communication between the logical domains and also enables the logical domains to use the hardware resources. The hypervisor (104) may also provide functionality to control various aspects of the hardware resources (106). For example, the hypervisor (104) may allocate subsets of the overall CPU, memory, and I/O resources to a logical domain. Further, the hypervisor may permit each logical domain to observe and interact with the hardware resources made available by the Hypervisor (104).

In one or more embodiments of the invention, the hardware resource(s) (106) corresponds to physical elements of the system including, but not limited to, CPUs/processors, graphic cards, sound cards, memory, input/output (I/O) channels, persistent storage, etc.

Figure 1B:
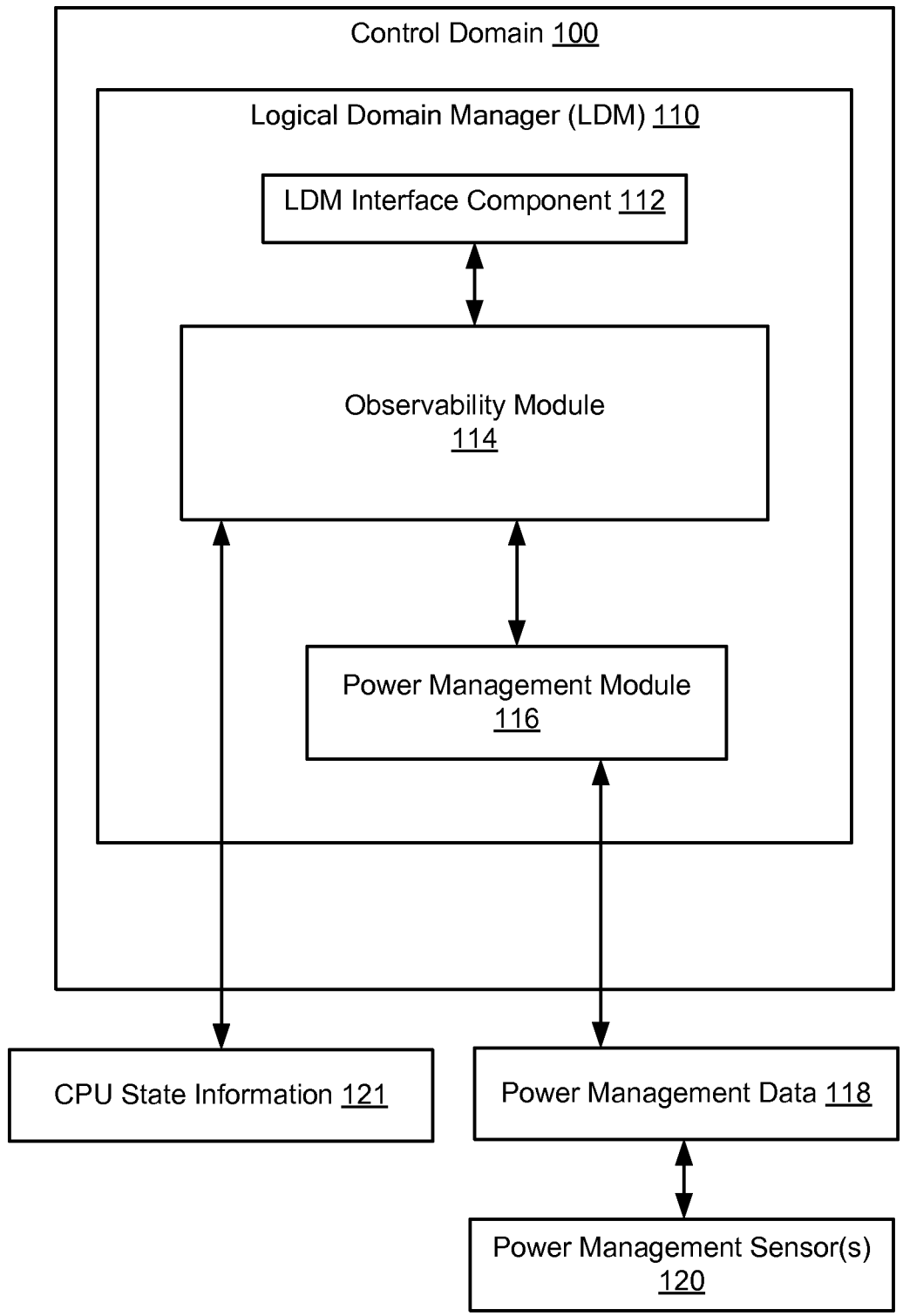
FIG. 1B shows a schematic diagram of a portion of the system shown in FIG. 1A in one or more embodiments of the invention.

FIG. 1B shows a schematic diagram of a portion of the system shown in FIG. 1A in one or more embodiments of the invention. As shown in FIG. 1B, the control domain includes a logical domains manager (LDM) (110), local domains manager interface component (112), an observability module (115), and a power management module (116). The portion of the system shown in FIG. 1B also includes power management data (118), power management sensor(s) (120), and CPU state information (121). Each of these components is described below.

In one or more embodiments of the invention, the LDM manages (110) the logical domains. Specifically, the LDM (110) may create, remove, and/or manage logical domains. The LDM (110) may track the mappings of physical resources allocated to logical domains. Further, the LDM (110) may also include functionality to communicate with the hypervisor (104) and logical domains to add and remove physical resources allocated to a particular logical domain. In one or more embodiments of the invention, physical resources may include, but are not limited to, a computer processor, memory, and any other physical resources. In one or more embodiments of the invention, the LDM (110) includes functionality to perform the functionality described in FIGS. 3-5.

In one or more embodiments of the invention, the LDM may include internal data structures. Specifically, the data structures may include strand utilization data (described below) and a percent of memory bound to each logical domain.

In one or more embodiments of the invention, the LDM (110) includes the LDM interface component (112). Specifically, the LDM interface component (112) acts as an administrative interface for the LDM. In one or more embodiments of the invention, the LDM interface component (112) receives and parses CLI commands and, in response to the CLI command, may generate a response and display (or otherwise provide) the response to an output device (e.g., a screen, printer, etc.). In one or more embodiments of the invention, the result may include power consumption data associated to one or more logical domains.

In one or more embodiments of the invention, a CLI command is a command that may be parsed by the LDM interface (112). For example, the CLI command may be a command to enable one or more of the following: display a list of logical domains, display time, display extrapolated power averages, display count reports of power consumption averages, show a timestamp, calculate power consumption averages, and calculate intervals of power consumption averages, etc. Further, a CLI command may combine multiple subcommands. As another example, a CLI command may include the combination of the command: interval and subcommand: count to show count reports for a specific interval of time of power consumption for a given logical domain. As another example, a CLI command may include requesting power consumption of a subset of logical domains in the system.

In one or more embodiments of the invention, the power management sensor(s) (120) obtain information about the power consumption of the hardware components powering the system. The power management sensor(s) (120) are configured to obtain at least power consumption information. For example, the power management sensor(s) (120) may obtain power consumption information related to processors, fans, memory, persistent storage and/or power consumption of other physical components in the system, etc. In one or more embodiments of the invention, the power management sensor(s) (120) provides the power management data (described below) to other components in the system.

In one or more embodiments of the invention, the power management data (118) is data used for observation and calculation of power consumption for one or more logical domains. More specifically, the power management data (118) includes, but is not limited to, information about power consumption of hardware resources that may be assigned to the logical domains, and, optionally, may include other information such as timestamps related to power consumption information. In addition, the power management data (118) may include hardware state data from other various components of the system (101). Further, the power management data (118) may include power consumption information or values determined using power consumption information. Further, the power management data may include virtual CPU usage, virtual memory usage, and any virtual resources used per logical domain. In one or more embodiments of the invention, the power management data may include power management data supplied by multiple sources.

In one or embodiments of the invention, the CPU state information (121) is data relating to CPU data used for observation and calculation of power consumption for one or more logical domains. More specifically, the CPU state information (121) may include, but is not limited to data about CPU status (e.g., identifying whether the CPU is idle or active). Further, the CPU state information (121) may include the processor speed of the CPU as a unit of measure (i.e. hertz). In one or embodiments of the invention, the CPU state information (121) may be distinct and separate from the power management data (118) supplied by multiple sources. Additionally, the CPU state information may include processor utilization supplied by the hypervisor (104).

In one or more embodiments of the invention, the power management module (116) retrieves (or otherwise obtains) power management data. The power management module (116) may be configured to continually poll for new power management data (118) at specified intervals of time.

Returning to FIG. 1B, in one or more embodiments of the invention, the observability module (114) is operatively connected to the power management module (116) in the LDM (110). The observability module (114) includes functionality to observe power consumption for one or more logical domains. The observability module (114) is configured to receive power management data (118) for each hardware resource and to calculate power consumption and power consumption averages based on the obtained power management data. In one or more embodiments of the invention, the observability module (114) includes functionality to calculate extrapolated power consumption data for one or more logical domains. More specifically, the observability module (114) may obtain strand utilization data and the percentage of bound memory for each logical domain from the CPU state information (121) and/or from the data structures within the LDM (110). Strand utilization data may include an average utilization of strands (i.e., hardware threads) in active logical domains. The observability module (114) may then calculate power consumption for one or more logical domains using the strand utilization data and the percent of memory bound to the logical domain(s).

In other embodiments of the invention, the per logical domain power consumption discussed above may be estimated using at least one of the following mechanisms: (i) power sensor measurements using power sensors associated with the hardware resources; (ii) if available from the aforementioned sensors, per logical domain utilization statistics; and (iii) if information as described under (ii) is not available, then the percentage of the resource assigned to a logical domain may be used as a proxy for its percent utilization; and (iv) if there is no information available about a given logical domain's usage of a resource (via (ii) or (iii) above), then the percentage utilization of the resource by the logical domain may be estimated using the percentage utilization by the logical domain of a related resource.

In one or more embodiments of the invention, the observability module (114) may also be configured to use the power consumption data to calculate the instantaneous processor power consumption and extrapolated system power consumption for each logical domain. Calculations may be based on intervals of time (e.g., 10 seconds) over which strand utilization data is averaged. In one or more embodiments of the invention, the observability module (114) manages and stores power consumption data for each logical domain. The observability module (114) may store the calculation results per logical domain in data structures. The data structures may include, but are not limited to, programming data structures such as: linked lists, hash tables, trees, etc. After storing power consumption data, the observability module (114) manages the data structure for fixed intervals of time within a greater interval of time. For example, an hour of one minute fixed interval calculations may be managed using the data from a linked list data structure, where there is a linked list for each logical domain in the linked list data structure. The data structures may only include data for logical domains that are active (i.e., logical domains that are currently executing on the system).

In one or more embodiments of the invention, each node in a linked list may include attributes (e.g., struct) such as the average power consumption data (118) for a logical domain. Each attribute may express an aspect of power consumption data (118) for a logical domain. For example, the attributes may include, but are not limited to, extrapolated power consumption percentages, extrapolated power consumption, memory power consumption, processor power consumption, memory timestamps, processor timestamps, etc. In one or more embodiments of the invention, each node of the linked list may correspond to a logical domain of the system (101).

Figure 2:
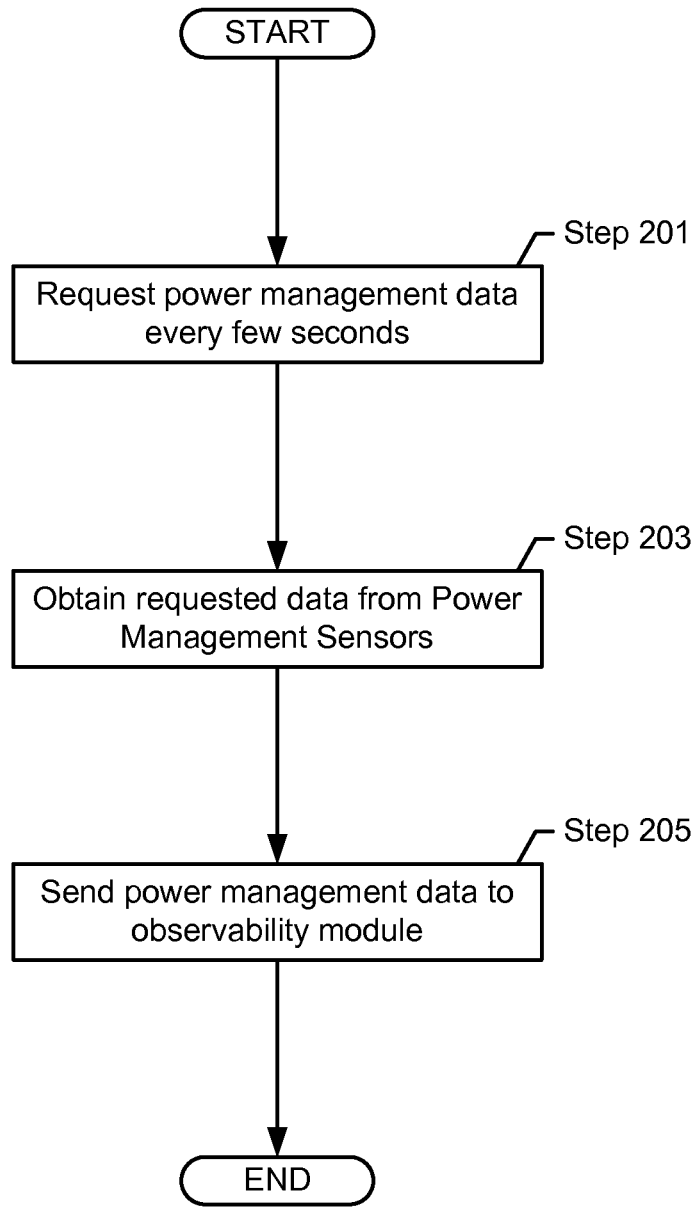
FIGS. 2-4 show flowcharts in one or more embodiments of the invention.
Figure 3:
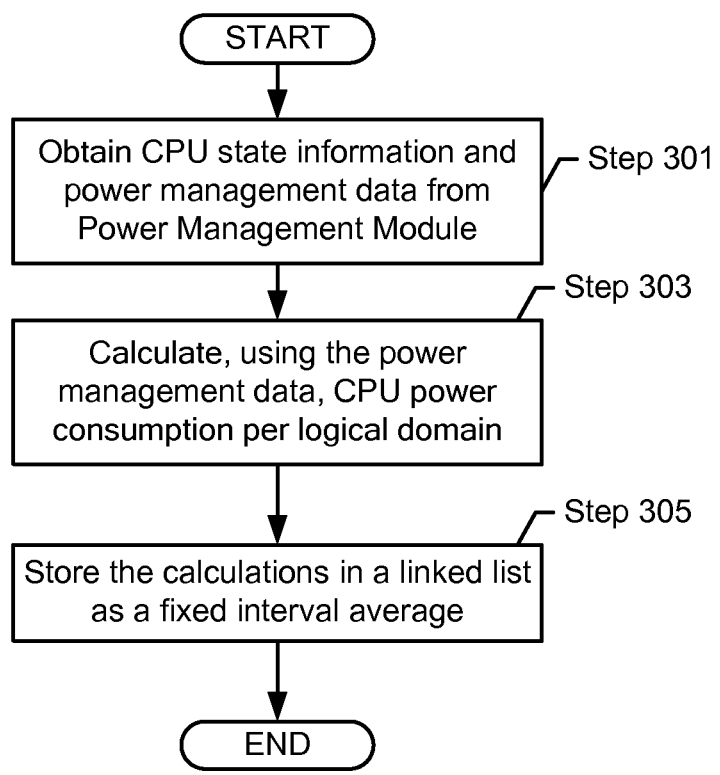
Figure 4:
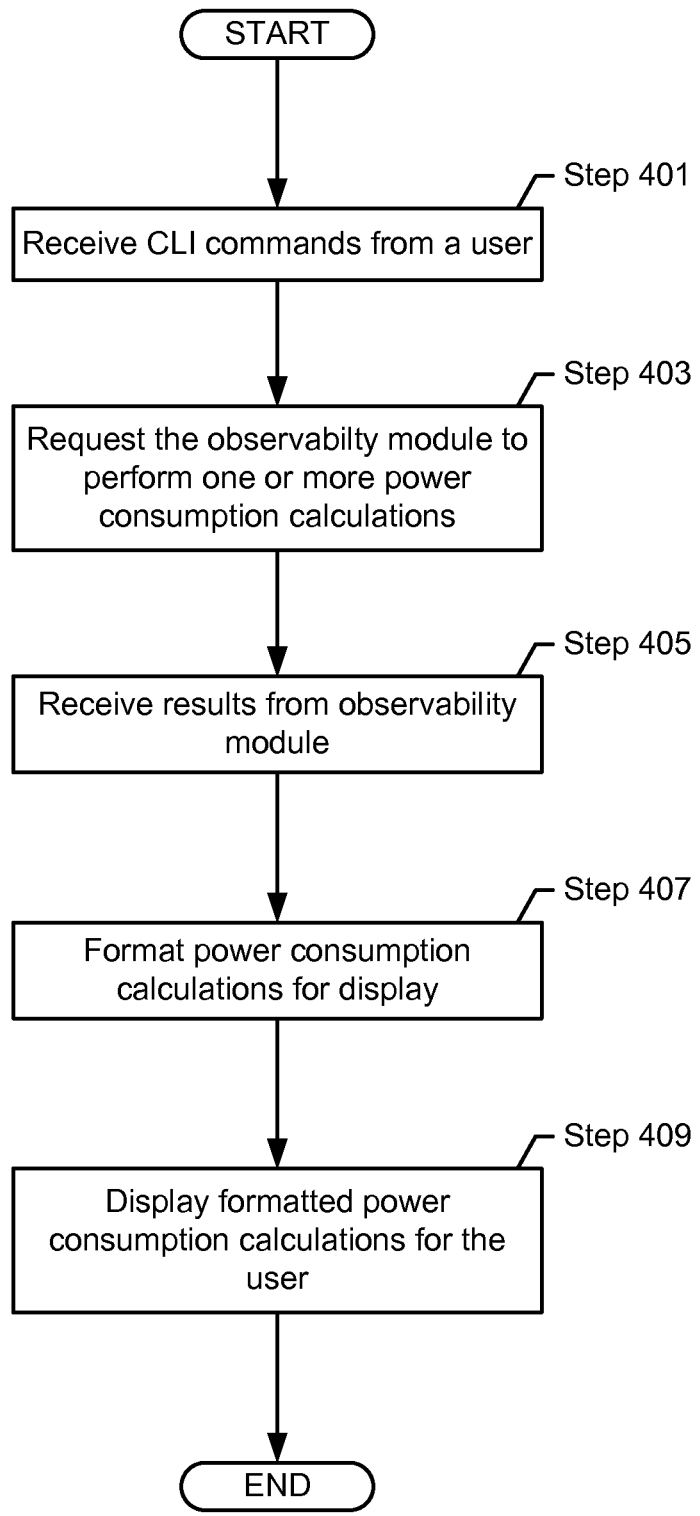

FIGS. 2-4 show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. Further, steps such as determination steps may or may not require an actual operation to be performed. In addition, one or more of the steps shown in FIGS. 2-4 may be performed in parallel.

FIG. 2 shows a flowchart for obtaining power management data in accordance with one or more embodiments of the invention. In Step 201, power management data is requested at set intervals (e.g., once every 5 seconds). In one or more embodiments of the invention, requesting power management data may include requesting power management data (e.g., power consumption obtained from memory and fan sensors) from the power management sensors continually at the set interval. The power management data acquired may be expressed in watts, kilowatts, etc.

In Step 203, requested power management data is obtained from power management sensors. In one embodiment of the invention, the power management data is obtained from a Management Information base (MIB) located on the system, where the MIB is populated by the power management sensors. In Step 205, power management data is sent by the power management module to the observability module. The power management module contacts the observability module and provides the power management data to the observability module. In one or more embodiments of the invention, storing power management data may include requesting the observability module to store the power management data as described in FIG. 1B, for example, in a linked list data structure. Specifically, the power management module requests (or otherwise calls) the observability module to manage and store the power management data.

FIG. 3 shows a flowchart for processing the power management data in accordance with one or more embodiments of the invention. In Step 301, CPU state information and power management data is obtained from the power management module. In Step 303, CPU power consumption per logical domain is calculated using the power management data. Specifically, calculating normalized power utilization may include calculating the percent of a processor's power that each strand consumes based on a percentage of utilization normalized by the processor frequency. In addition, calculations may include data relating to fans and memory of the system. In one or more embodiments of the invention, calculating power consumption may include calculating instantaneous CPU power consumption, extrapolated system power consumption per logical domain, rolling power consumption averages, etc.

In Step 305, the results of the aforementioned calculations are stored in a linked list as a fixed interval average. For example, observability module may maintain one linked list that includes the average power consumption for each logical domain calculated over one minute intervals for the last 60 minutes and may also maintain a second linked list that includes the average power consumption for each logical domain calculated over one hour time intervals over the last two weeks. As new results are obtained (see step 303), the aforementioned linked lists are updated.

In one or more embodiments of the invention, calculating average power consumption may include calculating power consumption for each logical domain by using strand normalized utilization from internal data structures of the LDM by polling the hypervisor for utilization information, and power consumption data from the power management sensor(s). Specifically, calculating normalized power utilization may include calculating the percent of a processor's power that each strand consumes based on the percent of utilization normalized by the processor frequency.

For example, if all cores of a processor are processing at the same frequency, then calculating power consumption includes the contribution to power from each strand in the logical domain based on its utilization.

The following is an example of calculating power consumption of logical domains when all cores are processing at the same frequency. The example is not intended to limit the invention. Turning to the example, consider a scenario in which the processor is consuming 990 watts, there are 16 strands, and strands 0-3 belong to domain A and stands 4-15 belong to strand B. Further, assume that stands 0-7 are running at 50% utilization, stands 8-11 are running at 75% utilization, and strands 12-15 are running at 100% utilization. Based on the above, the power consumption per strand may be calculated as follows: (i) strands 0-3: 4 strands*50%=2;

strands 4-7: 4 strands*50%=2; strands 8-11: 4 strands*75%=3; strands 12-15: 4 strands*100%=4. Accordingly, the total weight is 11 (2+2+3+4). Based on the total weighting of 11 and a total power consumption of 990 watts—each unit of weight is 90 watts. Thus, the power consumption of Domain A is 2*90=180 watts and the power consumption of Domain B=810 watts.

In contrast, if one core runs as lower frequency than another core in a processor (e.g., a cycle skip), then the utilization from strands in the core with a lower frequency is measured at lower utilization. In other words, the utilization of the core with the lower frequency uses less power than the utilization of the other core in the processor.

In one or more embodiments of the invention, strand utilization normalized by the processor frequency is used to calculate strand utilization normalized by power. Specifically, calculating strand utilization normalized by power may include calculating a percentage of the speed of a strand, identifying the processor frequency equivalent to the speed of the strand, and identifying the maximum power consumption at that processor frequency. Further, a percentage of full frequency power consumable at that processor frequency may be calculated using the maximum power consumption identified. In addition, the percentage of full frequency power may be used to calculate the strand utilization normalized by power.

The following is an example of calculating power consumption of logical domains when all cores are not processing at the same frequency. The example is not intended to limit the invention.

Turning to the example, consider a scenario in which a strand is utilized at sixty percent capacity and running at half its capable speed. The observability module receives the following data: processor speed is 1000 megahertz (Mhz), maximum power consumption is 200 watts, the maximum power consumption at 500 Mhz is 120 watts, strand utilization is 0.6 (i.e. 60%), strand normalized utilization is 0.3 (i.e. 30%), and power consumed by processor is 200 watts. As a result, the observability module calculates the percentage of speed of the strand is running at fifty percent (e.g., 0.3/0.6 is 0.5), the processor frequency equivalent to the percentage of the speed of the strand as 500 Mhz (e.g., 1000 Mhz*0.5 is 500 Mhz), the maximum power consumption at that processor frequency as 120 watts, the percentage of full frequency power consumed at that processor frequency at sixty percent (i.e. 0.6). Thus, the strand utilization normalized by power is thirty-six percent (e.g., 0.6*0.6 is 0.36).

In one or more embodiments of the invention, calculating the extrapolated consumption average may include calculating extrapolated values per logical domain using the processor power consumption calculated and memory power consumption based on the amount of memory bound to each logical domain. In one or more embodiments of the invention, power consumption averages extrapolated may reflect a percentage of overall system watts being consumed. Specifically, the extrapolated power consumption applies the percentage of utilization calculated for processor power consumption to the portion of the system where processor usage is not observable for each logical domain. In other words, extrapolated power translates to a percentage of total CPU power applied in addition to a percentage of total memory power applied.

For example, consider the scenario where CPU power, memory power, and system power equal 500, 200, and 1000 watts, respectively. Thus 300 watts of the system power is consumed by Other (non-CPU and non-memory, e.g. I/O or fans). A logical domain uses sixty percent of the total CPU power (i.e. 300 watts) and fifty percent of the memory power (i.e. 100 watts). The CPU power ratio of sixty percent is applied to the Other power (i.e. 180 watts). Thus the extrapolated power of the logical domain is 580 watts, which is the sum of the CPU power (i.e. 300 watts), memory power (i.e. 100 watts) and Other power (i.e., 180 watts).

FIG. 4 shows a flowchart for processing CLI commands in accordance with one embodiment of the invention. In Step 401, a CLI command(s) is received from a user. The user may include a person, a group, or any entity capable of entering CLI commands. In Step 403, the CLI command is received by the LDM interface component and parsed to determine what the information the user is seeking. In one or more embodiments of the invention, the LDM interface component constantly polls for power consumption calculations. The LDM interface component subsequently requests the observability module to provide results of one or more power consumption calculations to the LDM interface component. In one or more embodiments of the invention, the LDM interface component may be operatively connected or include a separate CLI program that the user invokes by entering CLI commands. Specifically, the CLI program contacts the LDM through a socket to deliver requested information and the LDM interface component manages requests that arrive via the socket. Further, the LDM interface may manage requests for information from multiple instances of the CLI program running simultaneously.

Additionally, the CLI program may iterate CLI commands for the user. Specifically, the user may enter a CLI command that continues running and sending new requests to the LDM for information (e.g., rolling averages). In one or more embodiments of the invention, the LDM interface component may request the observability module to provide power consumption calculations.

In Step 405, results of the power consumption calculations are received by the LDM interface component from the observability module. In Step 407, the power consumption results are formatted for display. Prior to display, the results of the power consumption calculations are formatted. The format may include, but is not limited, power consumption calculation results displayed as units of measure associated with an interval time (see examples below). Additionally, the format ensures structured and readable output for the user. In Step 409, the formatted results of the power consumption calculations are displayed for the user.

In one or more embodiments of the invention, examples of CLI commands may include, but are not limited to, specifying the resource for which per domain power consumption is being displayed such as 'processors' and 'memory', displaying minimum and maximum values, showing instantaneous power consumption, displaying power consumption for a list of one or more logical domains, displaying one hour worth of average power consumption data in fixed one minute intervals, and displaying fourteen days worth of average power consumption data in fixed one hour intervals.

Additionally, examples of CLI commands may further include showing the rolling average power consumption history for the past 15, 30 and 60 seconds, suppressing display of headers, displaying timestamps, display observability module version data, displaying extrapolated power consumption averages (e.g., this CLI option works with rolling, instantaneous, minute, and hour data output.), reporting with a specific interval, showing count reports, etc. The invention is not limited to aforementioned examples of CLI commands.

FIGS. 5A-5D show examples in accordance with one or more embodiments of the invention. The exemplary system is not intended to limit the scope of the invention. Further, some elements unnecessary for the purposes of the exemplary figures may have been omitted.

As depicted in FIG. 5A, the example shows displaying rolling averages to a user (500). The user requests calculation of rolling averages of power consumption per logical domain using the predefined CLI command "—rolling". After submitting the request, the rolling averages presented in a table. The table includes the rolling averages associated with each logical domain.

As shown in FIG. 5A, TABLE A includes rows and columns representing attributes per logical domain. As discussed above, each logical domain includes a domain name and rolling averages. The domain names include: primary, ldg1, and ldg2. The rows depict domain names that allow the user to determine the control domain and guest domains. In addition, the column headings depict different interval of times for the rolling averages. The rolling averages for each domain are shown corresponding to an interval of time. Specifically, each logical domain shows rolling averages for the last 15, 30, and 60 seconds.

Turning to FIG. 5B, the example shows displaying instantaneous power consumption to a user (510). As described above, the user requests instantaneous power consumption using the predefined CLI command "—instant" or "—instantaneous". As shown is FIG. 5B, TABLE B displays the instantaneous power consumption in watts associated with a timestamp per logical domain. The domain names include primary, guestdom1, and guestdom2. In addition, TABLE B displays the 15, 30, and 60 second rolling average power consumption for all logical domains every 10 seconds. Further, TABLE B continues to output power consumption until the user terminates the output. As depicted in FIG. 5C, the example shows the minimum and maximum power consumption to a user (520). As described above, the user requests minimum and/or maximum power consumption using the predefined CLI command "—extremes". As shown in FIG. 5C, each logical domain is represented in TABLE C by two rows displaying processor power consumption and an additional two rows displaying memory power consumption. Specifically, one row displays the maximum power consumption ever recorded and alternatively the other row displays the minimum power consumption ever recorded.

As depicted in FIG. 5D, the example shows power consumption to a user for a specified interval of time (530). After the user requests power consumption averages for a specified interval of time using the predefined CLI command "—list", a table (TABLE D) displays the requested data. The "—list" command specifies the logical domains for which the user requests power consumption averages. In addition, the user may specify the interval of time by adding an integer to the end of the command. As shown in FIG. 5D, the column heading includes domain names for each logical domain, a timestamp, and a one hour interval average of power consumption. Further, the data under each column corresponding to the domain name of the same row. As depicted in FIG. 5D, the user requested 12 hours worth of data starting from "May 4, 2011 12:05:33." The LDM interface component outputs 12 hours worth of power consumption in 12 separate tables per logical domain. FIG. 5D only shows three hours worth of averages for each logical domain.

In FIG. 6, the example shows extrapolated power consumption and overall instant system power consumption to a user (600). As described above, the user requests extrapolated power consumption using the predefined CLI command "—extrapolate". As shown in FIG. 6, the column heading of TABLE E includes the domain names and 15, 30, and 60 second rolling averages of power consumption for each logical domain. The extrapolated power consumption data is shown to the user as a power unit and a percentage for each interval of rolling averages. Further, the power units are displayed in watts and the percentage represents the amount of power usage from the power available.

Continuing with the example, the overall instant system power consumption is displayed to the user (610). The user may request to view the instant power using the predefined CLI command "—instant" in combination or separate from another CLI command, in accordance with one or more embodiments of invention. As shown in FIG. 6, TABLE F includes a list of devices and the amount of power consumption in watts. The list of devices are power consuming components of the system including the overall system, processors, memory, and fans. Further, each device is associated with the amount of power consumption depicted in the same row in TABLE F.

Figure 7:
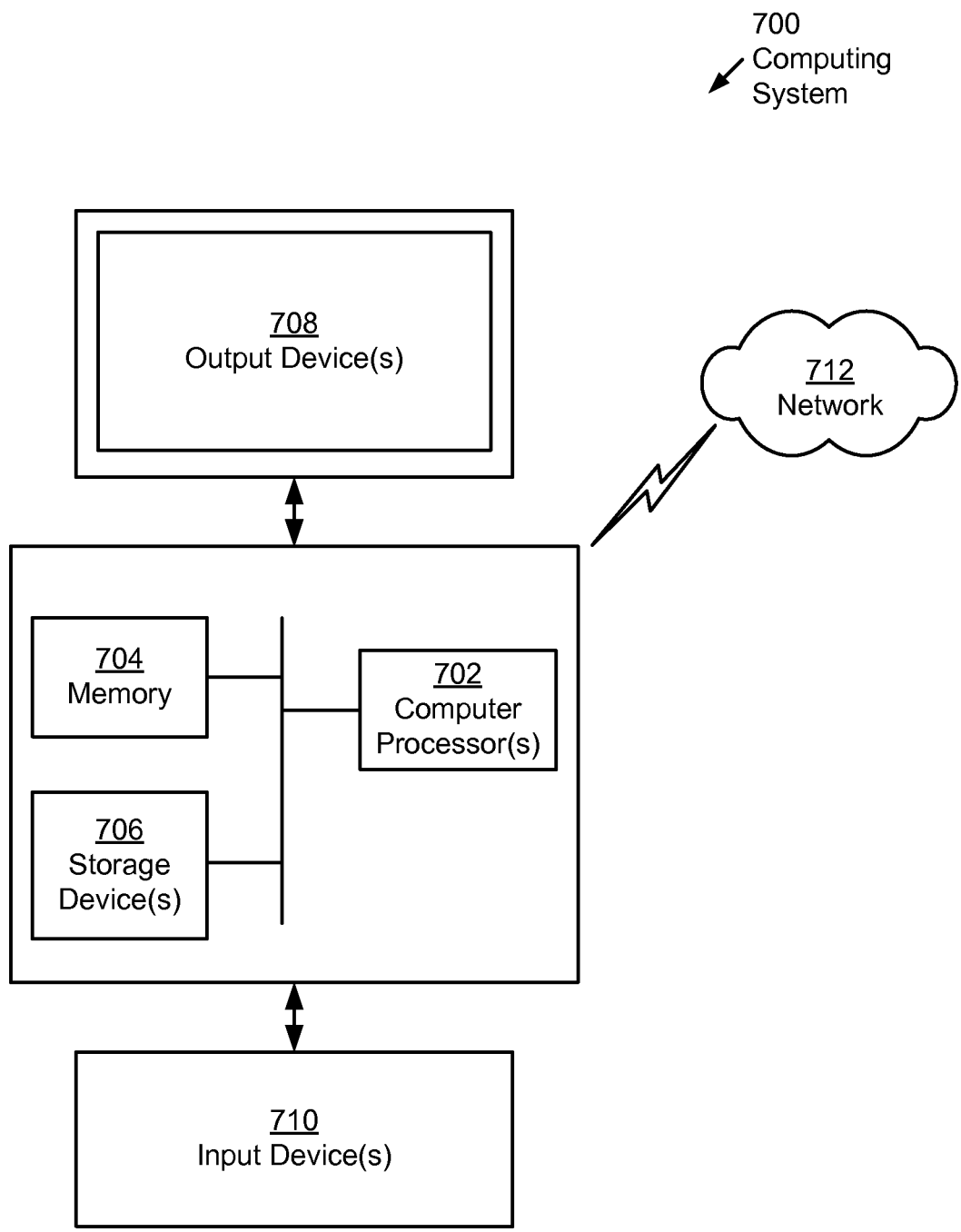
FIG. 7 shows a computer system in one or more embodiments of the invention.

Embodiments of the invention may be implemented on virtually any type of computer regardless of the platform being used. For example, as shown in FIG. 7, a computer system (700) includes one or more processor(s) (702), associated memory (704) (e.g., random access memory (RAM), cache memory, flash memory, etc.), a storage device (706) (e.g., a hard disk, an optical drive such as a compact disk drive or digital video disk (DVD) drive, a flash memory stick, etc.), and numerous other elements and functionalities typical of today's computers (not shown). The computer (700) may also include input means, such as a keyboard (708), a mouse (710), or a microphone (not shown). Further, the computer (700) may include output means, such as a monitor (712) (e.g., a liquid crystal display (LCD), a plasma display, or cathode ray tube (CRT) monitor). The computer system (700) may be connected to a network (714) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (700) includes at least the minimal processing, input, and/or output means necessary to practice embodiments of the invention.

Further, those skilled in the art will appreciate that one or more elements of the aforementioned computer system (700) may be located at a remote location and connected to the other elements over a network. Further, embodiments of the invention may be implemented on a distributed system having a plurality of nodes, where each portion of the invention (e.g., business data repository, social media analysis application, point of sale device, etc.) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer readable medium comprising instructions, which when executed by at least one processor perform a method, the method, comprising:
   obtaining power management data for a system comprising at least one processor, wherein a plurality of logical domains are executing on the system;
   determining, using the power management data, power consumption for each of the plurality of logical domains;
   receiving a first request for power consumption information for the system, wherein the first request for power consumption information comprises a Command Line Interface (CLI) command,
      wherein the CLI command is received by a logical domain manager (LDM) interface component executing in a control domain, and
      wherein the control domain is one of the plurality of logical domains;
   receiving a second request for power consumption information for the system,
      wherein the second request for power consumption information comprises the CLI command, and
      wherein the CLI command is received by the LDM interface component executing in the control domain; and
   providing, in response to at least the first request and the second request, the power consumption information, wherein the power consumption information specifies the power consumption for at least one of the plurality of logical domains.

2. The non-transitory computer readable medium of claim 1, wherein the power consumption information for the at least one logical domain is determined at least in part by calculating a power consumption of a strand executing in the system, wherein the power consumption of the strand is based at least in part on the frequency at which the strand is executing.

3. The non-transitory computer readable medium of claim 1, wherein the first request for power consumption information specifies a guest domain, wherein the guest domain is one of the plurality of logical domains.

4. The non-transitory computer readable medium of claim 1, wherein obtaining the power management data comprises collecting the power consumption information and combining per logical domain resource allocation and utilization information from multiple sources.

5. The non-transitory computer readable medium of claim 1, wherein providing the power management information comprises:
   formatting the power consumption for the at least one of the plurality of logical domains; and
   sending, after the formatting, the power consumption information to the LDM interface for display.

6. The non-transitory computer readable medium of claim 5, wherein formatting comprises calculating a rolling average of the power consumption for the at least one of the plurality of logical domains.

7. The non-transitory computer readable medium of claim 1, wherein the method further comprises:
   storing the power consumption for each of the plurality of logical domains in a data structure,
      wherein the data structure comprises aggregated power consumption information for the at least one of the plurality of logical domains.

8. The non-transitory computer readable medium of claim 7, wherein the aggregated power consumption information comprises at least one selected from a group consisting of: rolling averages of power consumption for the at least one of the plurality of logical domains and power consumption of the system.

9. The non-transitory computer readable medium of claim 7, wherein the aggregated power consumption information is stored using at least one linked-list.

10. The non-transitory computer readable medium of claim 7, wherein the power management data for the system is obtained at pre-determined intervals.

11. The non-transitory computer readable medium of claim 7, wherein the power management data for the system is extrapolated at fixed interval averages.

12. The non-transitory computer readable medium of claim 1, wherein the power consumption for each one of the plurality of logical domains is stored in the data structure while the particular logical domain is active.

13. The non-transitory computer readable medium of claim 1, wherein the power management data comprises at least one selected from a group consisting of per processor power consumption, system memory power consumption, system fan power consumption, and overall system power consumption.

14. A system for displaying power consumption, comprising:
   a processor;
   a hypervisor operatively connected to a plurality of logical domains comprising a plurality of guest domains and a control domain, wherein the control domain includes a logical domain manager (LDM) comprising:
      an observability module configured to:
         obtain power management data for the system;
         determine, using the power management data, power consumption for each of the plurality of logical domains;
         receive a first request for power consumption information for the system;
         receive a second request for power consumption information for the system; and
         provide, in response to the first request and the second request, the power consumption information, wherein the power consumption information specifies the power consumption for at least one of the plurality of logical domains; and
      an LDM interface configured to:
         receive the first request for power consumption information for the system,
            wherein the first request for power consumption information comprises a CLI command, and
            wherein the first request for power consumption information specifies a guest domain, wherein the guest domain is one of the plurality of logical domains;
         receive the second request for power consumption information for the system,
            wherein the second request for power consumption information comprises the CLI command, and
            wherein the second request for power consumption information specifies the guest domain; and
   a CLI executing in the control domain external to the observability module, wherein the CLI is configured to receive, from a user, at least the first request for power consumption information for the system and the second request for power consumption information for the system.

15. The system for claim 14, the wherein the LDM is further configured to obtain power management data from the hypervisor.

16. The system of claim 14, wherein the observability module is further configured to, as part of the providing,:
- format the power consumption for the at least one of the plurality of logical domains; and
- sending, after the formatting, the power consumption information to an LDM interface.

* * * * *